(12) United States Patent  
Goto et al.

(10) Patent No.: US 12,644,193 B2  
(45) Date of Patent: Jun. 2, 2026

(54) ENERGY UTILIZATION SYSTEM AND METHOD FOR PRODUCING CARBON-CONTAINING MATERIAL

(71) Applicants: THE DOSHISHA, Kyoto (JP); DAIKIN INDUSTRIES, LTD., Osaka (JP)

(72) Inventors: Takuya Goto, Kyoto (JP); Masamichi Ishikawa, Kyoto (JP); Takashi Watanabe, Kyoto (JP); Masanobu Kawazoe, Osaka (JP); Nobuaki Takeda, Osaka (JP); Yosuke Kishikawa, Osaka (JP); Akiyoshi Yamauchi, Osaka (JP); Tomohiro Isogai, Osaka (JP)

(73) Assignees: THE DOSHISHA, Kyoto (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/613,721

(22) Filed: Mar. 22, 2024

(65) Prior Publication Data

US 2024/0229268 A1 Jul. 11, 2024

Related U.S. Application Data

(63) Continuation of application No. PCT/JP2023/002269, filed on Jan. 25, 2023.

(30) Foreign Application Priority Data

Jan. 28, 2022 (JP) ................................. 2022-011716  
Aug. 10, 2022 (JP) ................................. 2022-128063

(51) Int. Cl.  
   *C25B 15/021*     (2021.01)  
   *B01D 53/00*     (2006.01)  
   (Continued)

(52) U.S. Cl.  
   CPC ............ *C25B 15/021* (2021.01); *B01D 53/00* (2013.01); *C25B 1/135* (2021.01); *C25B 3/26* (2021.01);  
   (Continued)

(58) Field of Classification Search  
None  
See application file for complete search history.

(56) References Cited

U.S. PATENT DOCUMENTS

2010/0022671 A1    1/2010   Olah et al.  
2018/0261862 A1    9/2018   Jahnke et al.  
2023/0383423 A1   11/2023   Goto et al.

FOREIGN PATENT DOCUMENTS

CN     104562075 A    4/2015  
CN     112391641 A    2/2021  
   (Continued)

OTHER PUBLICATIONS

Machine translation of Mitamura et al. JP 2016141868 A (Year: 2016).*

(Continued)

*Primary Examiner* — Wojciech Haske  
(74) *Attorney, Agent, or Firm* — Spencer Fane LLP

(57) ABSTRACT

An energy utilization system includes a circulation circuit. The circulation circuit includes a pump, a heating section, an electrolytic reduction apparatus, and a thermal energy recovery section. The pump receives a heating medium and outputs the heating medium. The heating section heats the heating medium by using renewable energy or energy obtained from waste heat. The electrolytic reduction apparatus heats an electrolytic solution with heat from the heating medium. The circulation circuit circulates the heating medium. A method for producing a carbon-containing material includes heating a heating medium circulating in a (Continued)

circulation circuit by using renewable energy or energy obtained from waste heat, and performing electrolytic reduction by heating an electrolytic solution with heat from the heating medium that has been heated.

19 Claims, 5 Drawing Sheets

(51) Int. Cl.

| | | |
|---|---|---|
| *C25B 1/135* | (2021.01) | |
| *C25B 3/26* | (2021.01) | |
| *F01K 3/08* | (2006.01) | |
| *F01K 15/00* | (2006.01) | |
| *F01K 17/02* | (2006.01) | |
| *F01K 23/18* | (2006.01) | |
| *F22B 1/16* | (2006.01) | |
| *F22B 1/18* | (2006.01) | |

(52) U.S. Cl.

CPC ............... *F01K 3/08* (2013.01); *F01K 15/00* (2013.01); *F01K 17/02* (2013.01); *F01K 23/18* (2013.01); *B01D 2257/504* (2013.01); *F22B 1/16* (2013.01); *F22B 1/18* (2013.01)

(56) References Cited

FOREIGN PATENT DOCUMENTS

| | | |
|---|---|---|
| EP | 2 905 359 A1 | 8/2015 |
| JP | 59-73096 A | 4/1984 |
| JP | 2006-317059 A | 11/2006 |
| JP | 2012-21221 A | 2/2012 |
| JP | 2014-74207 A | 4/2014 |
| JP | 2016-89230 A | 5/2016 |
| JP | 2016141868 A * | 8/2016 ............ F01K 23/10 |
| JP | 2017-8382 A | 1/2017 |
| JP | 2022-123865 A | 8/2022 |
| JP | 2022-138905 A | 9/2022 |

OTHER PUBLICATIONS

Machine translation of Kondo JP 2017008382 A (Year: 2017).*
International Preliminary Report of corresponding PCT Application No. PCT/JP2023/002269 dated Aug. 8, 2024.
International Search Report of related International Application No. PCT/JP2024/020974 dated Sep. 3, 2024.
Written Opinion of the International Search Authority of related International Application No. PCT Application No. PCT/JP2024/020974 dated Sep. 3, 2024.
International Search Report of corresponding PCT Application No. PCT/JP2023/002269 dated Apr. 11, 2023.
European Search Report of related EP Application No. 24 81 6691.0 dated Feb. 5, 2026.
Furuya et al.; Utilization of Gas-Diffusion Electrodes as Cathode for Carbon Dioxide Reduction; Electrochemistry, vol. 55 No. 10, pp. 787-788, 1987 Japan.
European Search Report of corresponding EP Application No. 23 74 6978.8 dated Feb. 17, 2026.

* cited by examiner

ENERGY UTILIZATION SYSTEM AND METHOD FOR PRODUCING CARBON-CONTAINING MATERIAL

CROSS-REFERENCE TO RELATED APPLICATIONS

This is a continuation of International Application No. PCT/JP2023/002269 filed on Jan. 25, 2023, which claims priority to Japanese Patent Application Nos. 2022-011716, filed on Jan. 28, 2022 and 2022-128063, filed on Aug. 10, 2022. The entire disclosures of these applications are incorporated by reference herein.

BACKGROUND

Technical Field

The present disclosure relates to an energy utilization system and a method for producing a carbon-containing material.

Background Art

In order to reduce the emissions of the greenhouse gas carbon dioxide and the like for the global environment, for example, development of techniques for carbon recycling, which intends to reuse carbon dioxide by reducing it to convert it into carbon compounds or the like, is currently ongoing.

For example, JPA No. 2016-89230 suggests not just obtaining typical carbon materials by decomposing carbon dioxide, but further producing high-value-added carbon materials such as diamond from carbon dioxide as a raw material.

SUMMARY

An energy utilization system according to a first aspect includes a circulation circuit. The circulation circuit includes a pump, a heating section, an electrolytic reduction apparatus, and a thermal energy recovery section. The pump is configured to receive a heating medium and output the heating medium. The heating section is configured to heat the heating medium by using renewable energy or energy obtained from waste heat. The electrolytic reduction apparatus is configured to heat an electrolytic solution with heat from the heating medium. The circulation circuit is configured to circulate the heating medium.

A method for producing a carbon-containing material according to a second aspect includes heating a heating medium circulating in a circulation circuit by using renewable energy or energy obtained from waste heat, and performing electrolytic reduction by heating an electrolytic solution with heat from the heating medium that has been heated.

DETAILED DESCRIPTION OF EMBODIMENT(S)

Hereinafter, energy utilization systems and methods for producing a material according to embodiments of the present disclosure will be described with examples.

(1) First Embodiment

Figure 1:
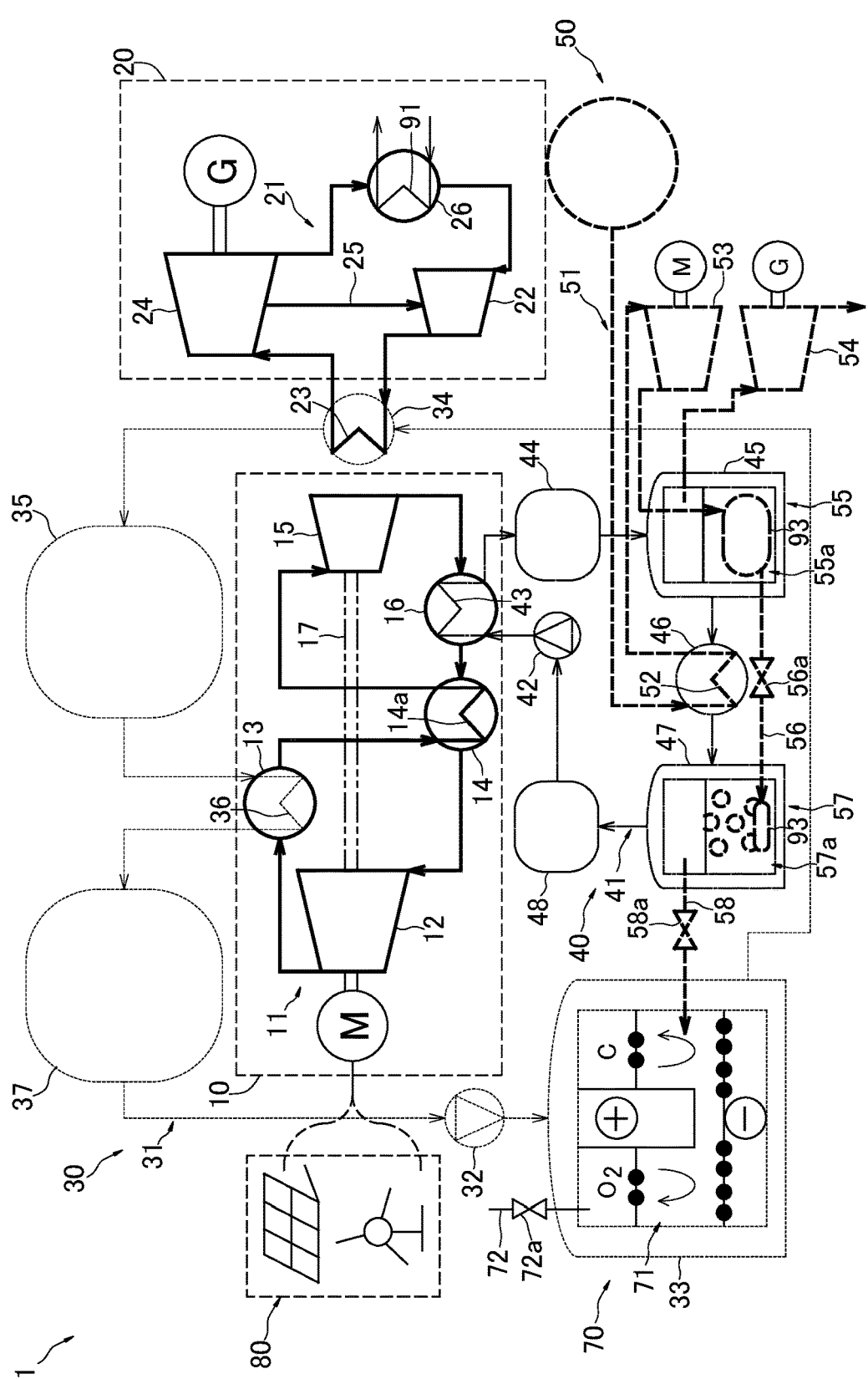
FIG. 1 is a schematic configurational diagram of an energy utilization system according to a first embodiment.

An energy utilization system 1 is a system that gives thermal energy, electric power, and a useful substance by using renewable energy and utilizes them, and includes, as illustrated in FIG. 1, a heat pump 10, a heat engine 20, a first heat utilization cycle 30, a second heat utilization cycle 40, a discharge gas feed line 50, and an electrolytic reduction apparatus 70.

(1-1) Heat Pump

The heat pump 10 includes a first refrigerant circuit 11 filled with a first refrigerant. The first refrigerant may be, for example, carbon dioxide, argon, or air. The first refrigerant circuit 11 includes a first compressor 12, a first high-temperature heat exchanger 13, a first expander 15, a first low-temperature heat exchanger 16, and an intermediate heat exchanger 14. The first compressor 12 compresses the first refrigerant sucked therein, and sends it to the first high-temperature heat exchanger 13. In the case where the first refrigerant is carbon dioxide, for example, the first refrigerant is pressurized to a pressure over the critical pressure in the first compressor 12. For the first compressor 12, renewable energy supplied via a renewable energy supply section 80 is used as a motive power source. For drive control of the heat pump 10, renewable energy supplied via the renewable energy supply section 80 may be used alone as the driving source; alternatively, both the renewable energy and electric power supplied from an electric power company may be used as the driving source. In the case where both the renewable energy and electric power supplied from an electric power company are used, it is preferable that electric power from the renewable energy be used more than the electric power supplied from an electric power company.

The renewable energy is, for example, energy obtained through solar power generation, wind power generation, hydroelectric power generation, biomass power generation, geothermal power generation, tidal power generation, hydrogen combustion power generation, or ammonia combustion power generation. Among them, solar power generation, wind power generation, and geothermal power generation are preferred because relatively steady power generation can be achieved in combination with reduced emissions of carbon dioxide. The first compressor 12 and the first expander 15 are linked to each other via a driven shaft 17. To the first compressor 12, motive power recovered in the first expander 15 is transmitted via the driven shaft 17 to assist the driving power of the first compressor 12. The first high-temperature heat exchanger 13 allows the first refrigerant flowing through the first high-temperature heat exchanger 13 and a first heating medium flowing through a first high-temperature-utilizing heat exchange section 36 in the first heat utilization cycle 30 to exchange heat with each other without mixing together, thereby heating the first heating medium and cooling the first refrigerant. The first refrigerant that has passed through the first high-temperature heat exchanger 13 is sent to an intermediate heat exchange section 14*a*, and allowed to exchange heat with the first refrigerant flowing through the intermediate heat exchanger 14 without mixing together. The first refrigerant that has passed through the intermediate heat exchange section 14*a* is depressurized in the first expander 15, and sent to the first low-temperature heat exchanger 16. The pressure of the first refrigerant, which is compressed in the first compressor 12 and depressurized in the first expander 15 to circulate in the first refrigerant circuit 11, is, in the case where the first refrigerant is carbon dioxide, for example, 2 MPa or higher and 30 MPa or lower. The pressure of the first refrigerant compressed in the first compressor 12 may be, for example, 25 MPa. The pressure of the first refrigerant depressurized in the first expander 15 may be, for example, 3 MPa. The first low-temperature heat exchanger 16 allows the first refrigerant flowing through the first low-temperature heat exchanger 16 and a second heating medium flowing through a second low-temperature-utilizing heat exchange section 43 in the second heat utilization cycle 40 to exchange heat with each other without mixing together, thereby cooling the second heating medium and heating the first refrigerant. The first refrigerant that has passed through the first low-temperature heat exchanger 16 is sent to the intermediate heat exchanger 14. In the intermediate heat exchanger 14, as described above, the first refrigerant flowing through the intermediate heat exchanger 14 is heated by the first refrigerant flowing through the intermediate heat exchange section 14*a*. The first refrigerant that has passed through the intermediate heat exchanger 14 is sucked into the first compressor 12.

(1-2) Heat Engine

The heat engine 20 includes a second refrigerant circuit 21 filled with a second refrigerant. The second refrigerant may be, for example, carbon dioxide, water, argon, or air. The second refrigerant circuit 21 includes a second compressor 22, a second high-temperature heat exchange section 23, a second expander 24, an injection passage 25, and a second low-temperature heat exchanger 26. The second compressor 22 compresses the second refrigerant sucked therein, and sends it to the second high-temperature heat exchange section 23. In the case where the second refrigerant is carbon dioxide, for example, the second refrigerant is pressurized to a pressure over the critical pressure in the second compressor 22. The second high-temperature heat exchange section 23 allows the second refrigerant flowing through the second high-temperature heat exchange section 23 and the first heating medium flowing through the first low-temperature-utilizing heat exchanger 34 in the first heat utilization cycle 30 to exchange heat with each other without mixing together, thereby heating the second refrigerant and cooling the first heating medium. The second refrigerant that has passed through the second high-temperature heat exchange section 23 is sent to the second expander 24. The second refrigerant sent to the second expander 24 is depressurized to an intermediate pressure, part of the second refrigerant branches off and is sucked into the second compressor 22, and the residual part is depressurized to a low pressure and sent to the second low-temperature heat exchanger 26. The second expander 24 generates electric power with energy recovered in depressurizing the second refrigerant. The electric power generated by the second expander 24 can be used, for example, as a motive power source for the first compressor 12 in the heat pump 10 or an electric power supply for a voltage to be applied in the electrolytic reduction apparatus 70. The second expander 24 may be linked to the second compressor 22 via a driven shaft in order to transmit motive power to the second compressor 22. The second low-temperature heat exchanger 26 allows the second refrigerant flowing through the second low-temperature heat exchanger 26 and a fluid fed from a cooling potential storage tank and flowing through a cooling passage 91 to exchange heat with each other without mixing together, thereby heating the fluid and cooling the second refrigerant. The fluid is not limited, and may be, for example, a second heating medium reserved in a second high-temperature tank 48 in the second heat utilization cycle 40. The second refrigerant that has passed through the second low-temperature heat exchanger 26 is sent to the second compressor 22. Into the second compressor 22, the second refrigerant depressurized in the second expander 24 is injected toward a part of intermediate pressure.

(1-3) First Heat Utilization Cycle

The first heat utilization cycle 30 includes a first heat utilization circuit 31 filled with a first heating medium. The first heating medium may be, for example, a mixed fluid containing sand or rock together with air, or a molten salt. The first heat utilization circuit 31 includes a first heating medium pump 32, an electrolytic reduction temperature control section 33, the first low-temperature-utilizing heat exchanger 34, a first low-temperature tank 35, the first high-temperature-utilizing heat exchange section 36, and a first high-temperature tank 37. The first heating medium pump 32 generates a flow to circulate the first heating medium into the first heat utilization cycle 30. The first heating medium that has passed through the first heating medium pump 32 is sent to the electrolytic reduction temperature control section 33. By the first heating medium sent to the electrolytic reduction temperature control section 33, the temperature of an electrolytic solution to be subjected to electrolytic reduction, is adjusted, for example, through heating the electrolytic solution. The first heating medium that has passed through the electrolytic reduction temperature control section 33 is sent to the first low-temperature-utilizing heat exchanger 34. The first low-temperature-utilizing heat exchanger 34 allows the first heating medium flowing through the first low-temperature-utilizing heat exchanger 34 and the second refrigerant flowing through the second high-temperature heat exchange section 23 in the heat engine 20 to exchange heat with each other without mixing together, thereby cooling the first heating medium and heating the second refrigerant. The first heating medium that has passed through the first low-temperature-utilizing heat exchanger 34 is sent to the first low-temperature tank 35. The temperature of the first heating medium to be reserved in the first low-temperature tank 35 is 200° C. or higher, preferably 250° C. or higher and 350° C. or lower, and, for example, 300° C. The first heating medium that has passed through the first low-temperature tank 35 is sent to the first high-temperature-utilizing heat exchange section 36. The first heating medium flowing through the first high-temperature-utilizing heat exchange section 36 exchanges heat with the first refrigerant flowing through the first high-temperature heat exchanger 13 in the heat pump 10, thereby being heated. The first heating medium that has passed through the first high-temperature-utilizing heat exchange section 36 is sent to the first high-temperature tank 37. The temperature of the first heating medium to be reserved in the first high-temperature tank 37 is 200° C. or higher, preferably 500° C. or higher and 700° C. or lower, and, for example, 600° C. The first heating medium that has passed through the first high-temperature tank 37 is sent to the first heating medium pump 32. It is preferable that the first low-temperature tank 35 and the first high-temperature tank 37 be each shielded from the surroundings with a heat-insulating material.

(1-4) Second Heat Utilization Cycle

The second heat utilization cycle 40 includes a second heat utilization circuit 41 filled with the second heating medium. The second heating medium may be, for example, an antifreeze such as ethylene glycol or water. The second heat utilization circuit 41 includes a second heating medium pump 42, the second low-temperature-utilizing heat exchange section 43, a second low-temperature tank 44, a cooling potential utilization section 45, a second high-temperature-utilizing heat exchanger 46, a heating potential utilization section 47, and the second high-temperature tank 48. The second heating medium pump 42 generates a flow to circulate the second heating medium into the second heat utilization cycle 40. The second heating medium that has passed through the second heating medium pump 42 is sent to the second low-temperature-utilizing heat exchange section 43. The second heating medium sent to the second low-temperature-utilizing heat exchange section 43 exchanges heat with the first refrigerant flowing through the first low-temperature heat exchanger 16 without mixing together, thereby being cooled. The second heating medium that has passed through the second low-temperature-utilizing heat exchange section 43 is sent to the second low-temperature tank 44. The temperature of the second heating medium to be reserved in the second low-temperature tank 44 is, for example, 0° C. or higher and 5° C. or lower, and preferably 0° C. The second heating medium that has passed through the second low-temperature tank 44 is sent to the cooling potential utilization section 45. The cooling potential utilization section 45 cools a growth vessel 55a in a recovery tank 55 to recover carbon dioxide contained in a discharge gas. Specifically, through being cooled, the growth vessel 55a in the recovery tank 55 functions as an ice-growing tank to fix carbon dioxide in the form of hydrate. The second heating medium that has cooled the growth vessel 55a in the recovery tank 55 in the cooling potential utilization section 45 is sent to the second high-temperature-utilizing heat exchanger 46. The second high-temperature-utilizing heat exchanger 46 allows the second heating medium flowing through the second high-temperature-utilizing heat exchanger 46 and a discharge gas flowing through a discharge gas cooling section 52 in a discharge gas feed line 50 to exchange heat with each other without mixing together, thereby heating the second heating medium and cooling the discharge gas. The second heating medium that has passed through the second high-temperature-utilizing heat exchanger 46 is sent to the heating potential utilization section 47. The heating potential utilization section 47 warms a gasification vessel 57a in a gasification tank 57 to gasify carbon dioxide hydrate 93 that has grown. The second heating medium that has passed through the heating potential utilization section 47 is sent to the second high-temperature tank 48. The temperature of the second heating medium to be reserved in the second high-temperature tank 48 is, for example, 30° C. or higher and 70° C. or lower, and may be 50° C. The second heating medium in the second high-temperature tank 48 is sent again to the second heating medium pump 42.

(1-5) Discharge Gas Feed Line

The discharge gas feed line 50 includes a discharge gas passage 51, which is a passage to recover carbon dioxide and waste heat for a discharge gas having a high temperature and being rich in carbon dioxide, such as a burnt gas from a factory or the like. The discharge gas to be used here may be, for example, a gas the temperature and pressure of which are 0.05 MPa or higher and 0.3 MPa or lower and 40° C. or higher and 80° C. or lower, respectively, or a gas the temperature and pressure of which are 0.1 MPa and 60° C., respectively. The discharge gas passage 51 includes a discharge gas cooling section 52, a discharge gas compressor 53, an electric power generator 54, a recovery tank 55, a hydrate feed line 56, a gasification tank 57, and a gas feed line 58. The discharge gas flowing through the discharge gas cooling section 52 exchanges heat with the second heating medium flowing through the second high-temperature-utilizing heat exchanger 46 in the second heat utilization cycle 40 without mixing together, thereby being cooled, and is sent to the discharge gas compressor 53. The discharge gas compressor 53 compresses the discharge gas, and feeds it to the growth vessel 55a as an ice-growing tank in the recovery tank 55. The pressure of the discharge gas compressed in the discharge gas compressor 53 and fed to the growth vessel 55a in the recovery tank 55 may be, for example, 1.0 MPa or higher and 2.0 MPa or lower, or 1.5 MPa. An overflow of the discharge gas without being converted into hydrate in the growth vessel 55a in the recovery tank 55 is sent to the electric power generator 54. Energy is recovered in the electric power generator 54, and used for electric power generation, giving electric power. The electric power generated by the electric power generator 54 can be used, for example, as a motive power source for the first compressor 12 in the heat pump 10 or an electric power supply for a voltage to be applied in the electrolytic reduction apparatus 70. The hydrate feed line 56 is a passage for sending the carbon dioxide hydrate 93 that has grown in the growth vessel 55a in the recovery tank 55 to the gasification vessel 57a in the gasification tank 57. The hydrate feed line 56 includes an on/off valve 56a, and sends the carbon dioxide hydrate 93 from the recovery tank 55 to the gasification tank 57 when the on/off valve 56a is opened. The carbon dioxide hydrate 93 warmed in the gasification vessel 57a in the gasification tank 57 gasifies to become carbon dioxide gas. The pressure of the discharge gas in the gasification vessel 57a in the gasification tank 57 may be, for example, 0.1 MPa or higher and 0.3 MPa or lower, or 0.2 MPa. The carbon dioxide gas is sent to an electrolyzer 71 in the electrolytic reduction apparatus 70 via the gas feed line 58. The gas feed line 58 includes an on/off valve 58a, and passes carbon dioxide gas therethrough when the on/off valve 58a is opened.

(1-6) Electrolytic Reduction Apparatus

The electrolytic reduction apparatus 70 is an apparatus that gives a carbon-containing material and oxygen by subjecting an electrolytic solution to electrolytic reduction. The electrolytic reduction apparatus 70 includes the electrolyzer 71 filled with an electrolytic solution. For example, the electrolytic solution may be an electrolytic solution of choice for the type of useful substance to be obtained through electrolytic reduction of the electrolytic solution. For example, it is preferable for the electrolytic solution to contain one or more selected from the group consisting of a carbonate ion, carbon dioxide, water, and nitrogen. Specifically, the electrolytic solution may contain, for example, an alkali metal halide, an alkaline earth metal halide, a nitrate of an alkali metal halide, a nitrate of an alkaline earth metal halide, a carbonate of an alkali metal halide, a carbonate of an alkaline earth metal halide, a hydroxide of an alkaline earth metal halide, a tetrafluoroborate of an alkali metal halide, a tetrafluoroborate of an alkaline earth metal halide, a hexafluorophosphate of an alkali metal halide, a hexafluorophosphate of an alkaline earth metal halide, a hexafluoroarsenate of an alkali metal halide, a hexafluoroarsenate of an alkaline earth metal halide, an oxide of an alkali metal halide, an oxide of an alkaline earth metal halide, or a perfluoro ionic liquid. More specifically, the electrolytic solution may contain, for example, $LiNO_3$, $NaNO_3$, $KNO_3$, $Li_2CO_3$, $LiOH$, $LiBF_4$, $LiPF_6$, or $LiAsF_6$. To the electrolytic solution, carbon dioxide gas fed via the gas feed line 58 is fed. The resulting electrolytic solution may contain, for example, carbon dioxide gas dissolved therein, or contain carbonate ions, or contain carbon dioxide gas dissolved therein and carbonate ions. The electrolytic solution in the electrolyzer 71 is heated by the electrolytic reduction temperature control section 33 in the first heat utilization cycle 30, and as a result, enhanced efficiency can be achieved in electrolytic reduction. The electrolytic solution in the electrolyzer 71 is in contact with a cathode and an anode, and subjected to electrolytic reduction with a voltage applied between them. The electric power to be used for voltage application for the electrolytic reduction is preferably electric power given by the second expander 24 or the electric power generator 54. Through the electrolytic reduction, a carbon-containing material, which is a useful substance as a reduction product, is precipitated on the cathode, and oxygen gas as an oxidation product is generated on the anode. The oxygen gas is recovered through an oxygen recovery line 72 provided with an on/off valve 72a. The carbon-containing material is not limited, and one or more selected from the group consisting of carbon monoxide, metal carbides, organic compounds, diamond, graphite, glassy carbon, amorphous carbon, carbon nanotubes, carbon nanohorns, and graphene can be obtained with different conditions for the electrolytic solution, the electrode materials, and so on. Examples of the organic compounds include one or more selected from the group consisting of methane, methanol, ethane, ethylene, acetylene, ethanol, formic acid, formaldehyde, oxalic acid, acetic acid, propane, propylene, propanol, butane, butene, butanol, acetone, benzene, toluene, and xylene.

(1-7) Features of First Embodiment

In the energy utilization system 1, the heat pump 10 is driven with renewable energy. In contrast to electric power provided by common electric power companies, electric power given with such renewable energy varies among different parts of a day, and the supply may be unstable. However, the heat pump 10 allows renewable energy to be used in a sufficiently effective manner by converting the renewable energy into heat to be stored in the first heat utilization cycle 30 and cooling potential to be stored in the second heat utilization cycle 40.

In addition, in the energy utilization system 1, the heat stored by the heat pump 10 in the first heat utilization cycle 30 is used for heating the second refrigerant to recover motive power in the second expander 24, allowing electric power to be generated. Moreover, the electric power given by the second expander 24 can be used for voltage application in the electrolytic reduction apparatus 70.

In the energy utilization system 1, the use of the heat stored by the heat pump 10 in the first heat utilization cycle 30 for heating the electrolytic solution in the electrolytic reduction apparatus 70 enables efficient electrolytic reduction.

Furthermore, the electrolytic reduction apparatus 70 can provide a useful material with use of carbon dioxide derived from a discharge gas.

Thus, useful substances derived from a discharge gas can be efficiently obtained in combination with achieving reduction in environmental loads caused by the discharge gas and effective use of renewable energy.

(2) Second Embodiment

The energy utilization system 1 of the first embodiment has been described as an example in which only one electrolytic reduction apparatus is used.

Figure 2:
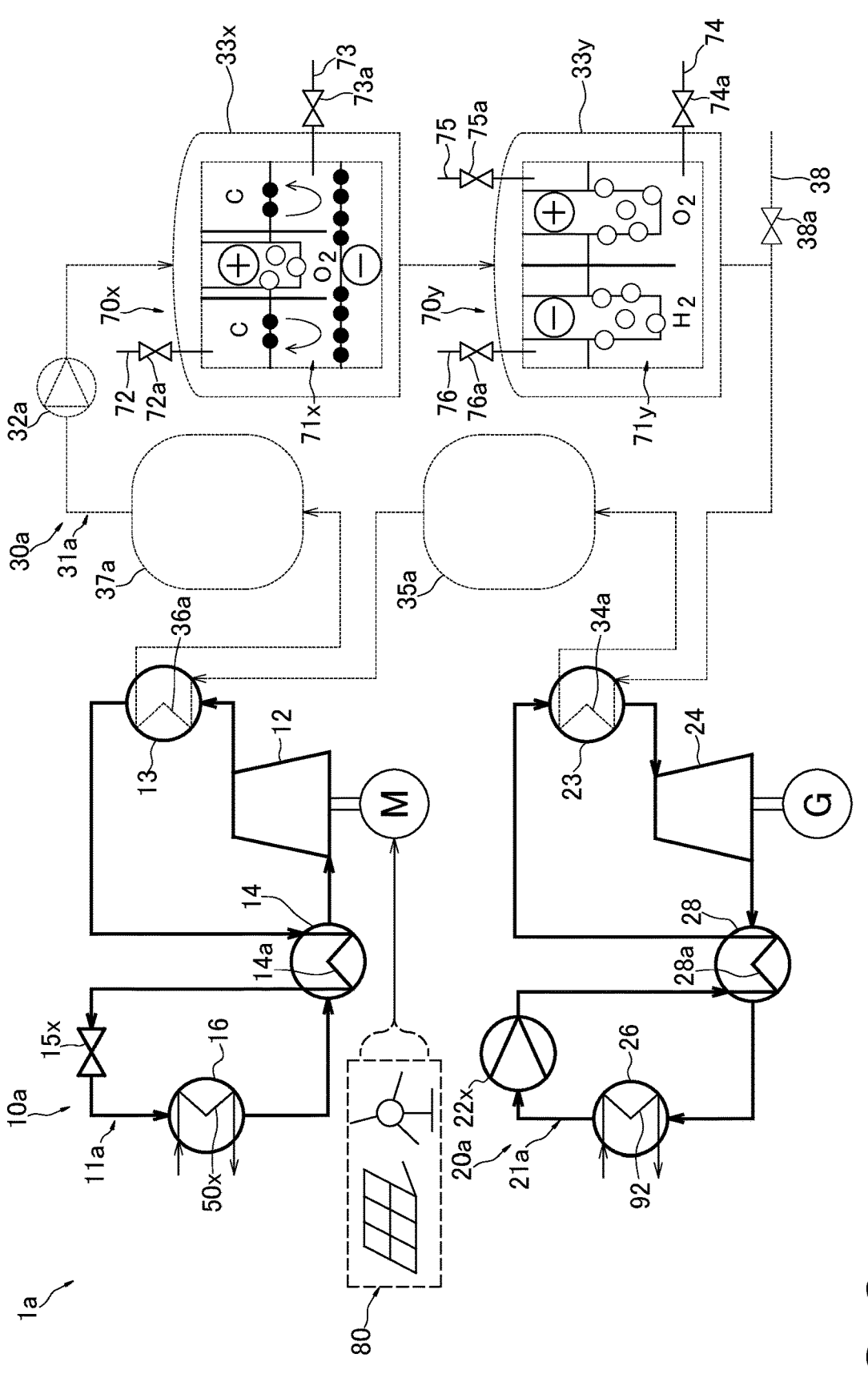
FIG. 2 is a schematic configurational diagram of an energy utilization system according to a second embodiment.

Meanwhile, for example, an energy utilization system 1a is permitted in which, as illustrated in FIG. 2, two electrolytic reduction apparatuses are used and different electrolytic solutions are subjected to electrolytic reduction.

The following describes the energy utilization system 1a of the second embodiment mainly with respect to differences from the energy utilization system 1 of the first embodiment.

The energy utilization system 1a is a system that gives thermal energy, electric power, and a useful substance by using renewable energy and energy from waste heat and utilizes them, and includes, as illustrated in FIG. 2, a heat pump 10a, a heat engine 20a, a heat utilization cycle 30a, a discharge gas feed line 50x, a first electrolytic reduction apparatus 70x, and a second electrolytic reduction apparatus 70y.

(2-1) Heat Pump

The heat pump 10a includes a first refrigerant circuit 11a filled with a first refrigerant. The first refrigerant may be, for example, R1233zd (E), R1234yf, R1234ze (E), R1234ze (Z), R134a, R32, R410a, R245fa, water, or carbon dioxide. The first refrigerant circuit 11a includes a first compressor 12, a first high-temperature heat exchanger 13, an expansion valve 15x, a first low-temperature heat exchanger 16, and an intermediate heat exchanger 14. The driven shaft 17 in the first embodiment is not provided, and recovery of motive power is not performed with the expansion valve 15x. The first low-temperature heat exchanger 16 allows the first refrigerant flowing through the first low-temperature heat exchanger 16 and a discharge gas flowing through the discharge gas feed line 50x to exchange heat with each other, thereby heating the first refrigerant and cooling the discharge gas. To the discharge gas feed line 50x, a discharge gas having a temperature as high as, for example, 80° C. and being rich in carbon dioxide, such as a burnt gas from a factory or the like, is applied.

(2-2) Heat Engine

The heat engine 20a includes a second refrigerant circuit 21a filled with a second refrigerant. The second refrigerant may be, for example, R1233zd (E), R1234yf, R1234ze (E), R1234ze (Z), R134a, R32, R410a, R245fa, water, or carbon dioxide. The second refrigerant circuit 21a includes a second pump 22x, a second high-temperature heat exchange section 23, a second expander 24, a second low-temperature heat exchanger 26, and a second intermediate heat exchanger 28. The second pump 22x forms a flow of the second refrigerant in the second refrigerant circuit 21a. The second intermediate heat exchanger 28 allows the second refrigerant flowing through the second intermediate heat exchanger 28 and the second refrigerant flowing through the second intermediate heat exchange section 28a from the second pump 22x toward the second high-temperature heat exchange section 23 to exchange heat with each other without mixing together. The second low-temperature heat exchanger 26 allows the second refrigerant flowing through the second low-temperature heat exchanger 26 and air fed from the outside and flowing through an air passage section 92 to exchange heat with each other. The second refrigerant circuit 21a is not provided with the second compressor 22 or the injection passage 25 in the first embodiment.

(2-3) Heat Utilization Cycle

The heat utilization cycle 30a includes a heat utilization circuit 31a filled with a heating medium. The heating medium may be, for example, a mixed fluid containing sand or rock together with air, water, a thermal oil, an ionic liquid, or a molten salt. The heat utilization circuit 31a includes a heating medium pump 32a, a first electrolytic reduction temperature control section 33x, a second electrolytic reduction temperature control section 33y, a low-temperature-utilizing heat exchanger 34a, a pressurizing line 38, a low-temperature tank 35a, a high-temperature-utilizing heat exchange section 36a, and a high-temperature tank 37a. The heating medium pump 32a generates a flow to circulate the heating medium into the heat utilization cycle 30a. The heating medium that has passed through the heating medium pump 32a is sent to the first electrolytic reduction temperature control section 33x. By the heating medium sent to the first electrolytic reduction temperature control section 33x, the temperature of an electrolytic solution to be subjected to electrolytic reduction in the first electrolytic reduction apparatus 70x is adjusted, for example, through heating the electrolytic solution. The heating medium that has passed through the first electrolytic reduction temperature control section 33x is sent to the second electrolytic reduction temperature control section 33y. By the heating medium sent to the second electrolytic reduction temperature control section 33y, the temperature of an electrolytic solution to be subjected to electrolytic reduction in the second electrolytic reduction apparatus 70y is adjusted, for example, through heating the electrolytic solution. The heating medium that has passed through the second electrolytic reduction temperature control section 33y is sent to the low-temperature-utilizing heat exchanger 34a. The pressurizing line 38, which allows the heating medium to be pressure-injected into the heat utilization circuit 31a, is provided between the second electrolytic reduction temperature control section 33y and the low-temperature-utilizing heat exchanger 34a to connect them. The pressurizing line 38 is provided with an on/off valve 38a that can be controlled to open or close. The heating medium circulating in the heat utilization circuit 31a is pressurized through the pressurizing line 38, and as a result, the volatilization of the heating medium is inhibited even at high temperature. In the case where water is used as the heating medium, for example, the volatilization is inhibited even over 100° C. The low-temperature-utilizing heat exchanger 34a allows the heating medium flowing through the low-temperature-utilizing heat exchanger 34a and the second refrigerant flowing through the second high-temperature heat exchange section 23 in the heat engine 20a to exchange heat with each other without mixing together, thereby heating the heating medium and cooling the second refrigerant. The heating medium that has passed through the low-temperature-utilizing heat exchanger 34a is sent to the low-temperature tank 35a. The temperature of the heating medium to be reserved in the low-temperature tank 35a is 80° C. or higher and lower than 100° C., and, for example, 90° C. The heating medium that has passed through the low-temperature tank 35a is sent to the high-temperature-utilizing heat exchange section 36a. The heating medium flowing through the high-temperature-utilizing heat exchange section 36a exchanges heat with the first refrigerant flowing through the first high-temperature heat exchanger 13 in the heat pump 10a without mixing together, thereby being heated. The heating medium that has passed through the high-temperature-utilizing heat exchange section 36a is sent to the high-temperature tank 37a. The temperature of the heating medium to be reserved in the high-temperature tank 37a is 100° C. or higher and 200° C. or lower, and, for example, 120° C. The heating medium that has passed through the high-temperature tank 37a is sent to the heating medium pump 32a. It is preferable that the low-temperature tank 35a and the high-temperature tank 37a be each shielded from the surroundings with a heat-insulating material.

(2-4) First Electrolytic Reduction Apparatus

The first electrolytic reduction apparatus 70x is an apparatus that gives a carbon-containing material and oxygen by subjecting an electrolytic solution to electrolytic reduction. The first electrolytic reduction apparatus 70x includes an electrolyzer 71x filled with an electrolytic solution. For example, the electrolytic solution may be an electrolytic solution of choice for the type of useful substance to be obtained through electrolytic reduction of the electrolytic solution, such as one or more selected from the group consisting of imidazolium ionic liquids, aromatic ionic liquids, pyrrolidinium ionic liquids, ammonium ionic liquids, piperidinium ionic liquids, and quaternary phosphonium ionic liquids. To the electrolyzer 71x, carbon dioxide gas is fed via a first feed line 73. The resulting electrolytic solution may contain, for example, carbon dioxide gas dissolved therein, or contain carbonate ions, or contain carbon dioxide gas dissolved therein and carbonate ions. The first feed line 73 is provided with an on/off valve 73a that can be controlled to open or close. The gas to be fed to the first feed line 73 is preferably carbon dioxide contained in a discharge gas from a factory or the like, and may be a discharge gas containing carbon dioxide gas. The electrolytic solution in the electrolyzer 71x is heated by the first electrolytic reduction temperature control section 33x in the heat utilization cycle 30a, and as a result, enhanced efficiency can be achieved in electrolytic reduction. The electrolytic solution in the electrolyzer 71x is in contact with a cathode and an anode, and subjected to electrolytic reduction with a voltage applied between them. The electric power to be used for voltage application for the electrolytic reduction is preferably electric power given by the second expander 24. Through the electrolytic reduction, a carbon-containing material, which is a useful substance as a reduction product, is precipitated on the cathode, and oxygen gas as an oxidation product is generated on the anode. The oxygen gas is recovered through an oxygen recovery line 72 provided with an on/off valve 72a. The carbon-containing material is not limited, and one or more selected from the group consisting of carbon monoxide, metal carbides, organic compounds, diamond, graphite, glassy carbon, amorphous carbon, carbon nanotubes, carbon nanohorns, and graphene can be obtained with different conditions for the electrolytic solution, the electrode materials, and so on. Examples of the organic compounds include one or more selected from the group consisting of methane, methanol, ethane, ethylene, acetylene, ethanol, formic acid, formaldehyde, oxalic acid, acetic acid, propane, propylene, propanol, butane, butene, butanol, acetone, benzene, toluene, and xylene.

(2-5) Second Electrolytic Reduction Apparatus

The second electrolytic reduction apparatus $70y$ is an apparatus that gives hydrogen and oxygen by subjecting water to electrolytic reduction. The second electrolytic reduction apparatus $70y$ includes an electrolyzer $71y$ filled with water. To the electrolyzer $71y$, water is fed via a second feed line 74. The second feed line 74 is provided with an on/off valve $74a$ that can be controlled to open or close. The electrolytic solution in the electrolyzer $71y$ is heated by the second electrolytic reduction temperature control section $33y$ in the heat utilization cycle $30a$, and as a result, enhanced efficiency can be achieved in electrolytic reduction. The electrolytic solution in the electrolyzer $71y$ is in contact with a cathode and an anode, and subjected to electrolytic reduction with a voltage applied between them. The electric power to be used for voltage application for the electrolytic reduction is preferably electric power given by the second expander 24. Through the electrolytic reduction, hydrogen gas as a reduction product is generated on the cathode, and oxygen gas as an oxidation product is generated on the anode. The hydrogen gas is recovered through a hydrogen recovery line 76 provided with an on/off valve $76a$. The oxygen gas is recovered through an oxygen recovery line 75 provided with an on/off valve $75a$.

(2-6) Features of Second Embodiment

Also in the energy utilization system $1a$, as with the case of the energy utilization system 1 of the first embodiment, the heat pump $10a$ allows renewable energy to be used in a sufficiently effective manner by converting the renewable energy into heat to be stored in the heat utilization cycle $30a$.

In addition, in the energy utilization system $1a$, the heat stored by the heat pump $10a$ in the heat utilization cycle $30a$ is used for heating the second refrigerant to recover motive power in the second expander 24, allowing electric power to be generated. Moreover, the electric power given by the second expander 24 can be used for voltage application in the first electrolytic reduction apparatus $70x$ and the second electrolytic reduction apparatus $70y$.

In the energy utilization system $1a$, the use of the heat stored by the heat pump $10a$ in the heat utilization cycle $30a$ for heating the electrolytic solutions in the first electrolytic reduction apparatus $70x$ and the second electrolytic reduction apparatus $70y$ enables efficient electrolytic reduction.

Furthermore, the first electrolytic reduction apparatus $70x$ can provide a useful material with use of carbon dioxide derived from a discharge gas. The second electrolytic reduction apparatus $70y$ can provide hydrogen and oxygen.

Thus, useful substances, other gases, and so on derived from a discharge gas can be efficiently obtained in combination with achieving reduction in environmental loads caused by the discharge gas and effective use of renewable energy.

(3) Third Embodiment

Figure 3:
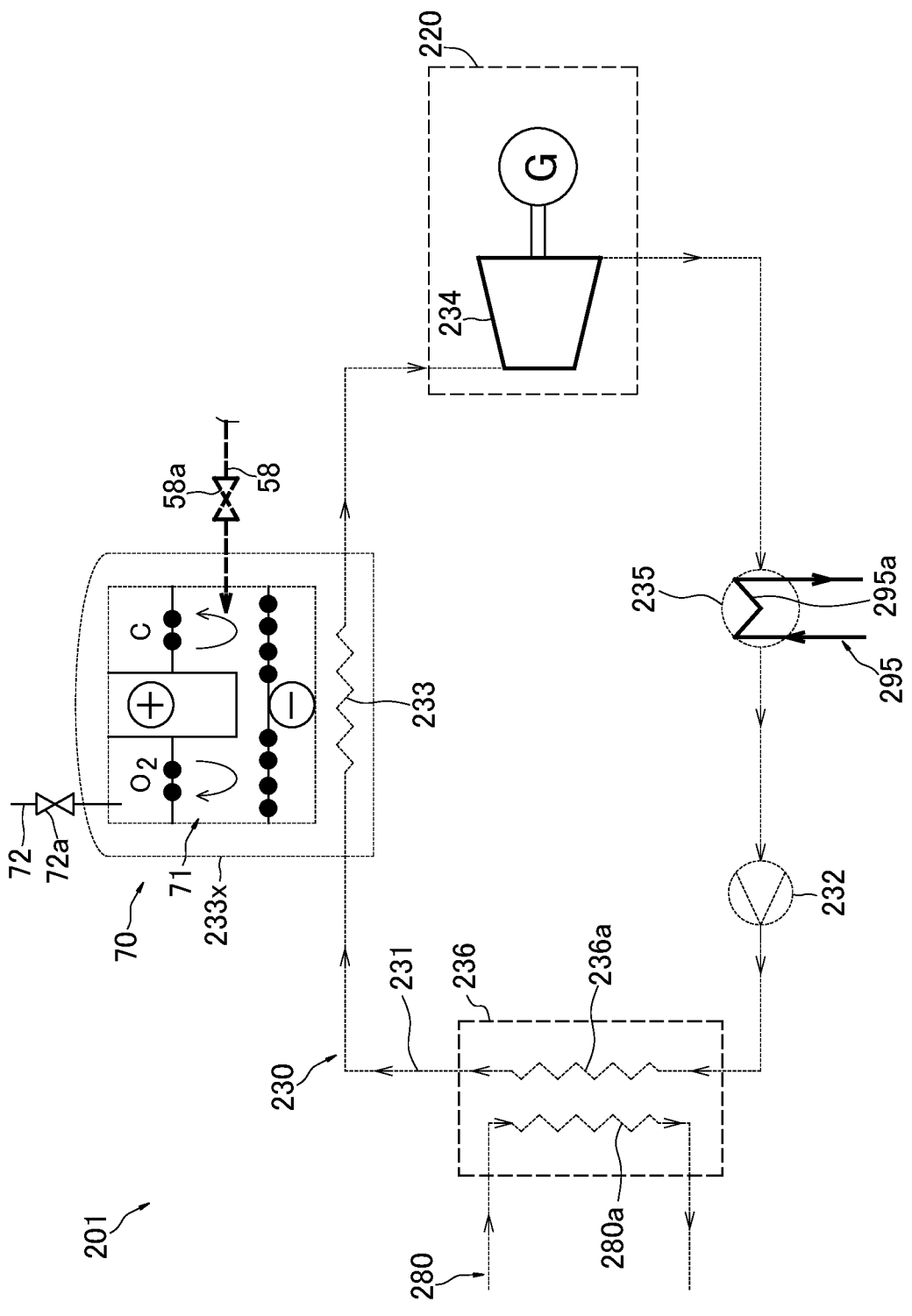
FIG. 3 is a schematic configurational diagram of an energy utilization system according to a third embodiment.

An energy utilization system 201 is a system that gives a useful substance by using renewable energy or waste heat and utilizes it, and includes, as illustrated in FIG. 3, a circulation circuit 230. The circulation circuit 230 includes a pump 232, a waste heat boiler 236, an electrolytic reduction apparatus 70, an electric power generator 220, a condenser 235, and a circulation passage 231 connecting them together. The interior of the circulation circuit 230 is filled with water. In the circulation circuit 230, the water circulates with undergoing back-and-forth phase transition between the states of liquid and steam.

(3-1) Pump

The pump 232 sucks the water liquefied through condensation in the condenser 235 and sends it out toward a water passage $236a$ in the waste heat boiler 236. The temperature of the water to be sucked by the pump 232 may be, for example, 30° C. or higher and 70° C. or lower, and is preferably 50° C. The pressure of the water to be sucked by the pump 232 may be, for example, 0.01 MPa or higher and 0.1 MPa or lower, and is preferably 0.02 MPa or higher and 0.03 MPa or lower. It should be noted that the atmospheric pressure is 0.1 MPa.

The flow rate of the water in the pump 232 may be 0.3 kg/s or higher and 0.8 kg/s or lower, and is preferably 0.45 kg/s or higher and 0.65 kg/s or lower.

The driving source of the pump 232 is not limited, and, for example, electric energy given by the electric power generator 220 may be used as the driving source; alternatively, renewable energy may be used.

(3-2) Waste Heat Boiler

The waste heat boiler 236 allows the water that has been sent out from the pump 232 and flown through the circulation circuit 230 and a discharge gas to exchange heat with each other without mixing together, thereby converting the water into stream. The waste heat boiler 236 includes a water passage $236a$ in which the water flows and a discharge gas passage $280a$ in which the discharge gas flows in a manner that allows heat exchange with each other. In the present embodiment, the water and the discharge gas are flowing in the opposite directions so that stream at higher temperature can be taken out.

The temperature of the discharge gas that flows in the discharge gas passage $280a$ may be, for example, 700° C. or higher and 900° C. or lower, and is preferably 800° C. The discharge gas passage $280a$ is a passage included in the discharge gas pipe 280 in which the discharge gas flows and extending in the interior of the waste heat boiler 236. The discharge gas pipe 280 is a pipe that introduces a high-temperature discharge gas discharged from, for example, a thermal power plant, a nuclear power plant, a chemical plant, a refinery, or an incineration plant into the waste heat boiler 236. The flow rate of the discharge gas may be, for example, 2.5 kg/s or higher and 3.5 kg/s or lower. The temperature of the discharge gas that has passed through the discharge gas passage $280a$ is, for example, 100° C. or higher and 250° C. or lower.

The water that flows into the water passage 236a is heated with heat from the discharge gas flowing through the discharge gas passage 280a to become steam. The temperature of the steam that flows out of the water passage 236a may be, for example, 500° C. or higher and 800° C. or lower, and is preferably 630° C. or higher and 670° C. or lower. The pressure of the stream that flows out of the water passage 236a may be, for example, 0.6 MPa or higher and 1.5 MPa or lower, and is preferably 0.7 MPa or higher and 1.2 MPa or lower. The waste heat boiler 236 is configured in such a manner that a supercooling heat exchange section in which the water in a supercooled state flows, a gas-liquid-coexisting heat exchange section in which the water in a gas-liquid two-phase state flows, and a superheating heat exchange section in which the water in a superheated state flows are linked together. The lengths of the supercooling heat exchange section, the gas-liquid-coexisting heat exchange section, and the superheating heat exchange section are designed roughly on the basis of the target value of temperature at which the water evaporates. The temperature of the steam from the water flowing through the water passage 236a is controlled to reach the target value by controlling either one or both of the flow rate in the pump 232 and the flow rate of the discharge gas flowing through the discharge gas pipe 280 by a flow rate regulator, which is not shown.

The steam that has passed through the water passage 236a in the waste heat boiler 236 is sent to a stored heat passage 233 extending in the interior of a heat storage tank 233x in the electrolytic reduction apparatus 70.

(3-3) Electrolytic Reduction Apparatus

As with the case of the first embodiment, the electrolytic reduction apparatus 70 is an apparatus that gives a carbon-containing material and oxygen by subjecting an electrolytic solution to electrolytic reduction. The electrolytic reduction apparatus 70 includes an electrolyzer 71 filled with an electrolytic solution. For example, the electrolytic solution may be an electrolytic solution of choice for the type of useful substance to be obtained through electrolytic reduction of the electrolytic solution. For example, it is preferable for the electrolytic solution to contain one or more selected from the group consisting of a carbonate ion, carbon dioxide, water, and nitrogen. Specifically, the electrolytic solution may contain, for example, an alkali metal halide, an alkaline earth metal halide, a nitrate of an alkali metal halide, a nitrate of an alkaline earth metal halide, a carbonate of an alkali metal halide, a carbonate of an alkaline earth metal halide, a hydroxide of an alkaline earth metal halide, a tetrafluoroborate of an alkali metal halide, a tetrafluoroborate of an alkaline earth metal halide, a hexafluorophosphate of an alkali metal halide, a hexafluorophosphate of an alkaline earth metal halide, a hexafluoroarsenate of an alkali metal halide, a hexafluoroarsenate of an alkaline earth metal halide, an oxide of an alkali metal halide, an oxide of an alkaline earth metal halide, or a perfluoro ionic liquid. More specifically, the electrolytic solution may contain, for example, $LiNO_3$, $NaNO_3$, $KNO_3$, $Li_2CO_3$, $LiOH$, $LiBF_4$, $LiPF_6$, or $LiAsF_6$. To the electrolytic solution, carbon dioxide gas fed via a gas feed line 58 is fed. The resulting electrolytic solution may contain, for example, carbon dioxide gas dissolved therein, or contain carbonate ions, or contain carbon dioxide gas dissolved therein and carbonate ions. Feeding of carbon dioxide gas to the electrolyzer 71 may be in any manner without limitation; for example, a gas rich in carbon dioxide such as a burnt gas from a facility or the like may be used, and the same configuration as the discharge gas feed line 50 in the above embodiment may be used.

The electrolytic reduction apparatus 70 includes the heat storage tank 233x shielding the electrolyzer 71 from the surroundings. The interior of the heat storage tank 233x is filled with a heat storage medium. An electrolytic solution in the electrolyzer 71 is heated with heat from the heat storage medium filling the heat storage tank 233x. As a result, enhanced efficiency can be achieved in electrolytic reduction. It is preferable that the heat storage tank 233x be shielded from the surroundings with a heat-insulating material, which is not shown. The interior of the heat storage tank 233x is provided with a stored heat passage 233 through which the steam flows without mixing with the heat storage medium. The heat storage medium in the heat storage tank 233x is heated with heat from the steam flowing through the stored heat passage 233. The heat storage tank 233x is filled with a sufficient amount of the heat storage medium, and retains heat received from the steam flowing through the stored heat passage 233 for a long time. Thereby, the temperature of the electrolytic solution in the electrolyzer 71 is kept almost constant for a long time.

The electrolytic solution in the electrolyzer 71 is in contact with a cathode and an anode, and subjected to electrolytic reduction with a voltage applied between them. The electric power to be used for voltage application for the electrolytic reduction is preferably electric power given by the electric power generator 220. Through the electrolytic reduction, a carbon-containing material, which is a useful substance as a reduction product, is precipitated on the cathode, and oxygen gas as an oxidation product is generated on the anode. The oxygen gas is recovered through an oxygen recovery line 72 provided with an on/off valve 72a. The carbon-containing material is not limited, and one or more selected from the group consisting of carbon monoxide, metal carbides, organic compounds, diamond, graphite, glassy carbon, amorphous carbon, carbon nanotubes, carbon nanohorns, and graphene can be obtained with different conditions for the electrolytic solution, the electrode materials, and so on.

The temperature of the steam that has passed through the stored heat passage 233 in the electrolytic reduction apparatus 70 may be, for example, 400° C. or higher and 750° C. or lower, and is preferably 600° C. or higher and 660° C. or lower. The pressure of the steam that has passed through the stored heat passage 233 in the electrolytic reduction apparatus 70 may be, for example, 0.5 MPa or higher and 1.2 MPa or lower, and is preferably 0.6 MPa or higher and 0.9 MPa or lower.

The steam that has passed through the stored heat passage 233 in the electrolytic reduction apparatus 70 is sent to the electric power generator 220.

(3-4) Electric Power Generator

The electric power generator 220 includes an expander 234 that is rotationally driven when the steam that has passed through the stored heat passage 233 in the electrolytic reduction apparatus 70 flows therein and passes therethrough. The electric power generator 220 generates electric power with energy recovered by the expander 234 when the steam is depressurized in the expander 234. Specifically, electric power is generated through the occurrence of rotational driving when the steam is depressurized in the expander 234.

The electric energy given by the electric power generator 220 is used as an electric power supply for a voltage to be applied in the electrolytic reduction apparatus 70.

The temperature of the steam that has passed through the expander 234 may be, for example, 30° C. or higher and 70° C. or lower, and is preferably 50° C. The pressure of the steam that has passed through the expander 234 may be, for example, 0.01 MPa or higher and 0.1 MPa or lower, and is preferably 0.02 MPa or higher and 0.03 MPa or lower.

The steam that has passed through the expander 234 is sent to the condenser 235.

(3-5) Condenser

In the condenser 235, the steam is cooled with a cooling medium fed from an external cooling potential source, and the steam condenses.

The condenser 235 includes a cooling medium passage 295*a* through which a cooling medium that exchanges heat with the steam or the water without mixing with the steam or the water flows. A cooling medium pipe 295 is a pipe that introduces the cooling medium from the cooling potential source to the condenser 235. The cooling medium passage 295*a* constitutes a part of the cooling medium pipe 295. The cooling potential source is not limited, and may be, for example, water or a refrigerant. For example, heat from the cooling medium flowing out of the cooling medium passage 295*a* may be used to obtain warm water for a hot spring facility or a heated pool.

The water that has passed through the condenser 235 is taken into the pump 232.

(3-6) Features of Third Embodiment

In the energy utilization system 201 of the third embodiment, the water circulating in the circulation circuit 230 is heated with heat from the discharge gas fed to the waste heat boiler 236. Meanwhile, the heat storage medium in the heat storage tank 233*x* in the electrolytic reduction apparatus 70 is heated by the high-temperature steam resulting from heating in the waste heat boiler 236. Accordingly, the electrolytic solution in the electrolyzer 71 in the electrolytic reduction apparatus 70 is heated, and efficient electrolytic reduction can be achieved. Thus, thermal energy for electrolytic reduction of the electrolytic solution can be secured with the thermal energy of a discharge gas or the like as an unnecessary product from thermal power generation or the like, and hence the thermal energy of the discharge gas can be effectively used without the need of newly obtaining thermal energy necessary for electrolytic reduction.

The electric power generator 220 gives electric energy by recovering the thermal energy of the steam. Accordingly, electric energy can be obtained by recovering thermal energy that has not used for heating the heat storage medium for heating the electrolytic solution from the thermal energy that the steam has received from the discharge gas. Then, the voltage application to the electrolytic solution in the electrolytic reduction apparatus 70 is performed with electric energy given by the electric power generator 220.

This avoids the need of newly obtaining thermal energy and electric energy necessary for the electrolytic reduction, and hence useful materials such as carbon and oxygen can be obtained while inevitable discharge of additional carbon dioxide is prevented.

(4) Additional Embodiments

(4-1) Additional Embodiment A

For the above embodiments, the case where an electrolytic solution containing carbon dioxide or carbonate ions is subjected to electrolytic reduction has been described as an example.

However, for example, the electrolytic solution may contain water or nitrogen, singly or additionally.

If water is contained in the electrolytic solution in addition to carbon dioxide, various organic compounds can be obtained through electrolytic reduction. If nitrogen is additionally contained in the electrolytic solution, amines and the like can be further obtained.

With an electrolytic solution containing only nitrogen without water, carbon nitrides can be obtained. Examples of the carbon nitrides include hexagonal carbon nitride ($\beta$-$C_3N_4$); graphite-like carbon nitride (g-$C_3N_4$); azafullerenes such as $(C_{59}N)_2$, $C_{58}N_2$, $C_{57}N_3$, and $C_{48}N_{12}$; cyanofullerenes represented by $C_{60}(CN)_{2n}$, wherein n is 1 to 9; and cyanogens such as NCCN and CNCN.

(4-2) Additional Embodiment B

For the above second embodiment, the case where a compound containing carbon, and hydrogen and oxygen are obtained has been described as an example.

Here, the electrolytic solution and the electrodes in the first electrolytic reduction apparatus 70*x* may be changed so as to obtain carbon monoxide as a compound containing carbon through electrolytic reduction therein. In this case, carbon monoxide can be obtained from the first electrolytic reduction apparatus 70*x*, and hydrogen and oxygen can be obtained from the second electrolytic reduction apparatus 70*y*. With the thus-obtained carbon monoxide, hydrogen, and oxygen, various types of organic compounds can be synthesized with ease.

(4-3) Additional Embodiment C

For the above first embodiment, the case where carbon dioxide hydrate is obtained with cooling potential given by the first low-temperature heat exchanger 16 in the heat pump 10 has been described as an example.

However, the usage of cooling potential given by the first low-temperature heat exchanger 16 in the heat pump 10 is not limited, and the cooling potential may be used for, for example, a refrigerator to cool objects that should be preserved under cooling, an air conditioner capable of cooling operations to lower the temperature of a target space, or cooling of brine such as water that is used for cooling an object to be cooled.

(4-4) Additional Embodiment D

For the above first embodiment, the energy utilization system 1 has been described as an example, in which a series of processing in the following is appropriately performed: in order to convert the renewable energy into thermal energy and store it in the heat pump 10, the first refrigerant discharged from the first compressor 12 is allowed to release heat in the first high-temperature heat exchanger 13 to heat the first heating medium to be sent to the first high-temperature tank 37, depressurized in the first expander 15, and allowed to absorb heat in the first low-temperature heat exchanger 16 to cool the second heating medium to be sent to the second low-temperature tank 44; and carbon dioxide contained in a discharge gas discharged from a factory or the like is separated and recovered.

Figure 4:
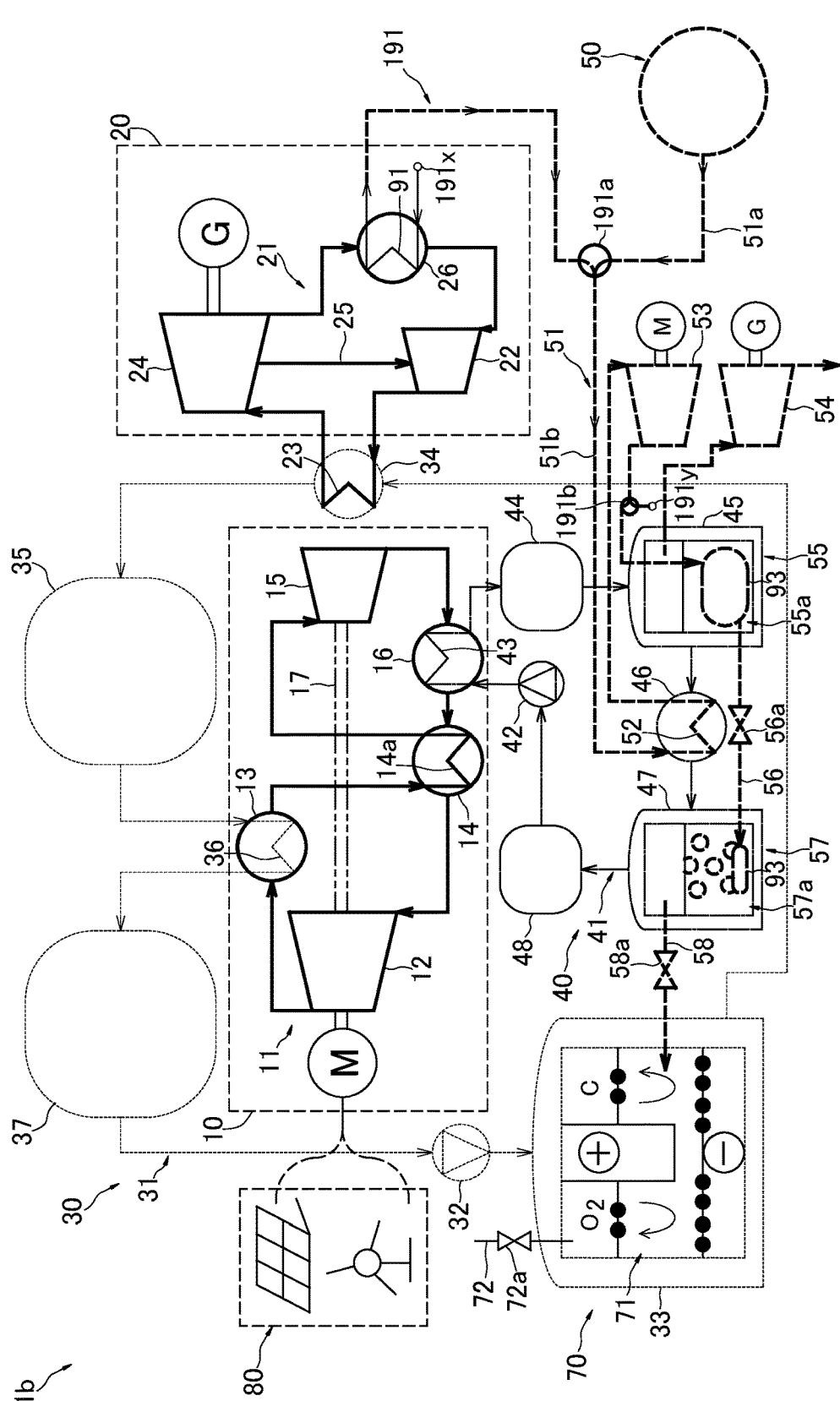
FIG. 4 is a schematic configurational diagram of an energy utilization system according to additional embodiment D.

However, the energy utilization system may be, for example, an energy utilization system 1b in which, as illustrated in FIG. 4, the discharge gas feed line 50 includes a branched passage 191 in which the cooling passage 91 is included and the atmosphere flows, a first switching valve 191a, and a second switching valve 191b.

The branched passage 191 is a passage that allows the atmosphere to be taken from an upstream end 191x and pass through the cooling passage 91 extending in the second low-temperature heat exchanger 26 in the second refrigerant circuit 21, and then joins with the discharge gas passage 51. The first switching valve 191a is a switching valve for switching between a state in which an upstream-side discharge gas passage 51a, which is an upstream part of the discharge gas passage 51, and a downstream-side discharge gas passage 51b, which is a downstream part of the discharge gas passage 51, are connected together and a state in which the downstream-side discharge gas passage 51b and the branched passage 191 are connected together, and is configured with, for example, a three-way valve. The second switching valve 191b is a switching valve for switching between a state in which a downstream-side part of the discharge gas compressor 53 and the recovery tank 55 are connected together and a state in which the downstream-side part of the discharge gas compressor 53 and a downstream end 191y opening to the atmosphere are connected together, and is configured with, for example, a three-way valve.

For operating the energy utilization system 1b, for example, a first operation and a second operation may be switched to each other.

In the first operation, without putting the heat engine 20 and the electrolytic reduction apparatus 70 in action, the first switching valve 191a is preliminary set to give the state in which the upstream-side discharge gas passage 51a and the downstream-side discharge gas passage 51b are connected together, the second switching valve 191b is preliminary set to give the state in which the downstream-side part of the discharge gas compressor 53 and the recovery tank 55 are connected together, and, without heating the gasification vessel 57a in the gasification tank 57 to gasify carbon dioxide hydrate 93, the heat pump 10 is put in action with energy supplied from the renewable energy supply section 80 and the first heating medium pump 32 is driven to store heat in the first heat utilization cycle 30, and at the same time the second heating medium pump 42 is driven to put the second heat utilization cycle 40 in action to feed cooling potential to the cooling potential utilization section 45, and the discharge gas compressor 53 is driven to flow carbon dioxide into the discharge gas passage 51 in the discharge gas feed line 50, and eventually the carbon dioxide is cooled in the growth vessel 55a in the recovery tank 55, thus being separated and recovered. In the first operation, the on/off valve 56a in the hydrate feed line 56 is closed, and a discharge gas containing carbon dioxide that has failed in becoming carbon dioxide hydrate 93 is sent to the electric power generator 54 and the energy is recovered. When sufficient growth of carbon dioxide hydrate 93 has been achieved, the first operation is terminated, the on/off valve 56a in the hydrate feed line 56 is opened to allow the carbon dioxide hydrate 93 to move to the gasification tank 57, and the second operation is initiated.

In the second operation, the first switching valve 191a is set to give a state in which the downstream-side discharge gas passage 51b and the branched passage 191 are connected together, the second switching valve 191b is set to give a state in which the downstream-side part of the discharge gas compressor 53 and the downstream end 191y opening to the atmosphere are connected together, the discharge gas compressor 53 is driven, the second heat utilization cycle 40 is put in action, the on/off valve 58a in the gas feed line 58 is controlled to open, the first heating medium pump 32 is put in action, and the heat engine 20 and the electrolytic reduction apparatus 70 are put in action. Through the operation, the air taken from the upstream end 191x of the branched passage 191 into the branched passage 191 exchanges heat in the cooling passage 91 with the second refrigerant flowing through the second low-temperature heat exchanger 26 in the heat engine 20 in action, thereby being heated. The air heated in the cooling passage 91 passes through the discharge gas passage 51, and in the second high-temperature-utilizing heat exchanger 46 exchanges heat with the second heating medium, thereby heating the second heating medium. Thus, the second heating medium heated with waste heat from the heat engine 20 is sent to the heating potential utilization section 47 in the second heat utilization cycle 40, and as a result, the gasification vessel 57a in the gasification tank 57 is warmed. The air flowing through the discharge gas passage 51 after heating the second heating medium in the second high-temperature-utilizing heat exchanger 46 is introduced to the downstream end 191y via the discharge gas compressor 53, and released into the atmosphere. The warming of the gasification vessel 57a in the gasification tank 57 results in efficient gasification of carbon dioxide hydrate 93 into carbon dioxide, and the carbon dioxide resulting from the gasification can be fed to the electrolytic reduction apparatus 70 via the gas feed line 58. In the second operation, the electrolytic solution in the electrolytic reduction apparatus 70 is heated through feeding heat stored in the first heat utilization cycle 30 to the electrolytic reduction temperature control section 33, and electrolytic reduction in the electrolytic reduction apparatus 70 is performed with use of electric power generated in the heat engine 20 for voltage application to the electrolytic solution. Although the heat pump 10 may be put in action or not in this case, putting the heat pump 10 in action is desirable in the presence of sufficient energy supply from the renewable energy supply section 80.

(4-5) Additional Embodiment E

For the above third embodiment, the energy utilization system 201, in which the steam that has passed through the stored heat passage 233 in the electrolytic reduction apparatus 70 is sent to the electric power generator 220, has been described as an example.

However, for example, the heat engine 20 described for the first embodiment may be used in place of the electric power generator 220 in the energy utilization system 201 of the third embodiment. In this case, it follows that the steam that has passed through the stored heat passage 233 in the electrolytic reduction apparatus 70 exchanges heat with the second refrigerant flowing through the second refrigerant circuit 21 in the heat engine 20, and as a result, the thermal energy of the steam is recovered in the second refrigerant.

(4-6) Additional Embodiment F

For the above third embodiment, the case where water circulates in the circulation circuit 230 has been described as an example.

However, the fluid that circulates in the circulation circuit 230 is not limited to water, and may be, for example, another heating medium such as a refrigerant, and is preferably a medium that undergoes phase transition and increases in volume when heated in a heating section such as the waste heat boiler 236.

(4-7) Additional Embodiment G

For the third embodiment, the case where the electrolytic solution in the electrolytic reduction apparatus 70 is heated with heat from the steam circulating in the circulation circuit 230 via the heat storage medium in the heat storage tank 233$x$ has been described as an example.

However, for example, the second electrolytic reduction apparatus 70$y$ in the second embodiment may be used in place of the electrolytic reduction apparatus 70; otherwise, the first electrolytic reduction apparatus 70$x$ and the second electrolytic reduction apparatus 70$y$ in the second embodiment may be used in place of the electrolytic reduction apparatus 70. In these cases, it follows that the energy utilization system is configured to allow the steam circulating in the circulation circuit 230 to pass through a passage provided in such a manner that the steam is not mixed with the heat storage medium filling the first electrolytic reduction temperature control section 33$x$ in the first electrolytic reduction apparatus 70$x$ and a passage provided in such a manner that the steam is not mixed with the heat storage medium filling the second electrolytic reduction temperature control section 33$y$ in the second electrolytic reduction apparatus 70$y$.

(4-8) Additional Embodiment H

For the above third embodiment, the case where the water circulating in the circulation circuit 230 is heated with the thermal energy of the discharge gas flowing through the waste heat boiler 236 has been described as an example.

However, the way of heating the water circulating in the circulation circuit 230 is not limited to that method, and the water may be heated, for example, by using heat from underground magma via a heat pipe or the like. Alternatively, the water circulating in the circulation circuit 230 may be heated with solar light concentrated with a lens and a reflecting minor or the like.

(4-9) Additional Embodiment I

The energy utilization system 1 of the first embodiment, the energy utilization system 1$a$ of the second embodiment, and the energy utilization system 201 of the third embodiment are not limited in terms of utilization, and can be used, for example, in a microgrid system.

The microgrid system is an energy system that integrates distributed energy resources (DER) such as distributed energy and energy-storing facilities and an energy network together at a certain scale and operates them. For example, the microgrid system may be a system that is completely separated from a main electric power network operated by an electric power company and constantly performs independent energy operations, or a system that is connected to a main electric power network operated by an electric power company in normal times and unconnected to perform independent energy operations in times of emergency, such as times of disaster.

Figure 5:
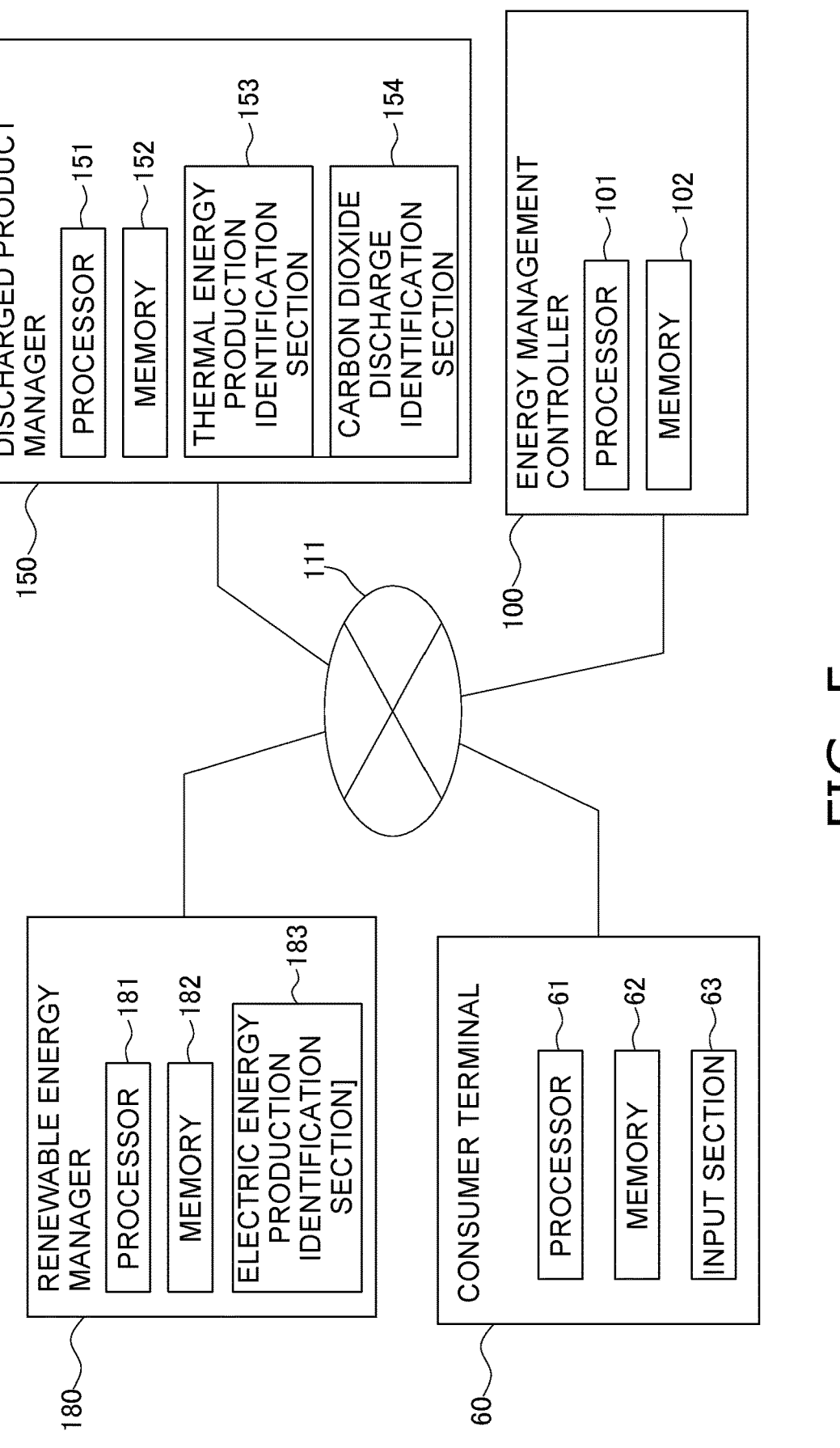
FIG. 5 is a schematic configurational diagram of a network that is used in a microgrid system.

FIG. 5 illustrates an exemplary network to be used for a microgrid system including the energy utilization system 1 of the first embodiment.

For example, the microgrid system may be one including: a renewable energy supply section 80 such as a solar power plant, a wind power plant, and a hydroelectric power plant; a renewable energy manager 180 that manages renewable energy; a heat pump 10; a heat engine 20; a first heat utilization cycle 30; a second heat utilization cycle 40; a discharge gas feed line 50; an electrolytic reduction apparatus 70; a discharged product supply section, not shown, such as a thermal power plant, a nuclear power plant, a plant, and a hot spring; a discharged product manager 150 that manages a waste heat supply section; a consumer facility, not shown, that consumes electric power energy generated by the heat engine 20; a consumer terminal 60 that manages the consumer facility; an energy network facility, not shown, that links those facilities; an energy management controller 100 that properly controls supply and consumption of energy; and a communication network 111 that communicably connects the renewable energy manager 180, the consumer terminal 60, the energy management controller 100, and so on.

The renewable energy manager 180 includes, for example, a processor 181 such as a CPU (Central Processing Unit), a memory 182 such as a ROM and a RAM, and an electric energy production identification section 183 that identifies the amount of electric energy generated in the renewable energy supply section 80, and is disposed in the renewable energy supply section 80. The renewable energy manager 180 is communicably connected to the energy management controller 100 via the communication network 111.

The discharged product manager 150 includes a processor 151 such as a CPU, a memory 152 such as a ROM and a RAM, a thermal energy production identification section 153, and a carbon dioxide discharge identification section 154, and is disposed in the discharged product supply section such as a thermal power plant and a nuclear power plant. The discharged product manager 150 is communicably connected to the energy management controller 100 via the communication network 111. The thermal energy production identification section 153 identifies the amount of thermal energy discharged from the discharged product supply section such as a thermal power plant and a nuclear power plant. The carbon dioxide discharge identification section 154 identifies the amount of carbon dioxide discharged from the discharged product supply section such as a thermal power plant.

The consumer facility is a facility that consumes residual electric energy after using electric energy generated by the heat engine 20 in the electrolytic reduction apparatus 70, or consumes residual thermal energy after using thermal energy given by the heat pump 10 in the electrolytic reduction apparatus 70, or consumes both the energies, and examples of the consumer facility include factories, office buildings, houses, power feed devices for electric vehicles, and plant factories. To a factory, an office building, a house, or a plant factory among them, for example, heat stored in the first heat utilization cycle 30 or cooling potential stored in the second heat utilization cycle 40 is supplied upon a request from it. The heat or cooling potential may be supplied to the consumer by delivering a heat storage material capable of storing heat or cooling potential to the location of the consumer facility. To a factory, an office building, a house, a power feed device for an electric vehicle, or a plant factory, electric energy generated by the heat engine 20 is supplied upon a request from it. The electric energy may be supplied by delivering to the location of the consumer facility with an electric wire, a storage battery, or the like. The heat storage material, electric wire, and storage battery are each used as an energy network facility. Upon a request from a consumer, a carbon-containing material obtained from the electrolytic reduction apparatus 70 is supplied by, for example, transporting it.

The consumer terminal 60 includes a processor 61 such as a CPU, a memory 62, an input section 63, and so on, and is disposed in the consumer facility. The consumer terminal 60 is communicably connected to the energy management controller 100 via the communication network 111. The input section 63 is configured with a touch panel, a keyboard, or the like, and receives at least any one request of a request of supply of thermal energy, a request of supply of electric energy, and a request of a carbon-containing material obtained through electrolytic reduction from a consumer as the owner of the consumer terminal 60.

The energy management controller 100 includes a processor 101 such as a CPU (Central Processing Unit) and a memory 102 such as a ROM and a RAM. The energy management controller 100 is communicably connected to the heat pump 10, the heat engine 20, the first heat utilization cycle 30, the second heat utilization cycle 40, the discharge gas feed line 50, the electrolytic reduction apparatus 70, and so on. The energy management controller 100 performs operation control for the heat pump 10, the heat engine 20, the first heat utilization cycle 30, the second heat utilization cycle 40, the discharge gas feed line 50, the electrolytic reduction apparatus 70, and so on with reference to pieces of information received via the communication network 111.

Referring to the amount of electric energy identified by the electric energy production identification section 183 in the renewable energy manager 180, the energy management controller 100 performs drive control for the heat pump 10 by controlling the rotational frequency of the first compressor 12 in the heat pump 10 in order to convert the electric energy into thermal energy to be reserved. Although the amount of renewable energy to be obtained with the renewable energy manager 180 tends to fluctuate as compared with common electric energy provided by electric power companies, the renewable energy manager 180 allows energy supplied as renewable energy to be converted into thermal energy and stored in the first heat utilization cycle 30 and to be converted into energy as cooling potential and stored in the second heat utilization cycle 40 through the heat pump 10. Then, the thermal energy stored in the first heating medium in the first heat utilization cycle 30 can be used in subjecting the electrolytic solution to electrolytic reduction in the electrolytic reduction apparatus 70. Specifically, the thermal energy stored in the first heating medium in the first heat utilization cycle 30 is used for heating the electrolytic solution in the electrolytic reduction apparatus 70, and electric energy resulting from conversion of the thermal energy stored in the first heating medium in the first heat utilization cycle 30 by the heat engine 20 is used for voltage application to the electrolytic solution in the electrolytic reduction apparatus 70. Thereby, the requisite energy for heating the electrolytic solution in the electrolytic reduction apparatus 70 and voltage application thereto can be covered not by renewable energy with fluctuations but by the energy stored in the first heat utilization cycle 30, and as a result, stable electrolytic reduction can be achieved. More specifically, data including a desired temperature for the electrolytic solution to be subjected to electrolytic reduction in the electrolytic reduction apparatus 70 and a desired voltage to be applied thereto are stored in advance in the memory 102 included in the energy management controller 100, and based on the data, the flow rate of the first heating medium in the first heating medium pump 32 is controlled in such a manner that the temperature conditions and applied voltage conditions for the electrolytic solution are satisfied.

When the amount of thermal energy identified by the thermal energy production identification section 153 is sufficient, the energy management controller 100 can give enhanced operation efficiency by allowing the first refrigerant in the intermediate heat exchanger 14 in the heat pump 10 to be heated or allowing the first heating medium in the first low-temperature tank 35 and first high-temperature tank 37 to be heated in the first heat utilization cycle 30.

The energy management controller 100 controls, for example, the rotational frequency of the discharge gas compressor 53 in the discharge gas feed line 50 on the basis of the amount of carbon dioxide discharged from the discharged product supply section such as a thermal power plant and a plant, the amount identified by the carbon dioxide discharge identification section 154 in the discharged product manager 150, and the degree of growth of carbon dioxide hydrate 93. Thereby, the amount of carbon dioxide to be used for electrolytic reduction can be controlled. Here, the energy management controller 100 controls the degree of cooling the growth vessel 55a with the cooling potential stored in the second heat utilization cycle 40 by adjusting the flow rate in the second heating medium pump 42. Thereby, the growth vessel 55a is cooled to such a temperature that carbon dioxide can be sufficiently cooled in the cooling potential utilization section 45.

Although the foregoing description is on a microgrid system including the energy utilization system 1 of the first embodiment, for example, a microgrid system including the energy utilization system 1a of the second embodiment may be employed. In this case, the flow rate of the heating medium in the heating medium pump 32a is controlled in such a manner that the temperature conditions and applied voltage conditions for the electrolytic solution in the first electrolytic reduction apparatus 70a and those for the electrolytic solution in the second electrolytic reduction apparatus 70b are satisfied.

Others

Here, the renewable energy may be, for example, energy obtained through one or more selected from the group consisting of solar power generation, wind power generation, hydroelectric power generation, biomass power generation, geothermal power generation, tidal power generation, hydrogen combustion power generation, and ammonia combustion power generation. For example, the renewable energy may be such that the amount of energy to be provided varies among different parts of a day, thus having fluctuations, in contrast to such energy as electric power supplied via a main electric power network operated by an electric power company.

Here, the waste heat is not limited, and examples thereof include heat discharged from a thermal power plant, a nuclear power plant, a chemical plant, a refinery, an incineration plant, geothermal activity, or hot spring water.

In the present energy utilization system, a heating medium is heated by using renewable energy or energy obtained from waste heat, and the electrolytic reduction apparatus heats an electrolytic solution with heat from the heating medium. Through the process, a reduced material can be obtained from the electrolytic solution while such energy usage that leads to increased emissions of greenhouse gases including carbon dioxide is prevented.

For reducing the emission of carbon dioxide through electrolytic reduction of an electrolytic solution to which carbon dioxide has been fed, for example, using not energy obtained through a process that inevitably involves discharging carbon dioxide but renewable energy or energy obtained from waste heat as requisite thermal energy for the electrolytic reduction enables reduction in carbon dioxide emissions through minimizing the discharge of carbon dioxide.

Even if the amount of the renewable energy or energy obtained from waste heat fluctuates to cause the variation of the temperature of the heating medium flowing in the circulation circuit, the temperature variation can be leveled to allow use of high-quality thermal energy.

Since the present energy utilization system drives the heat pump by using electric power generated with the renewable energy, the heat pump driven can achieve reduced environmental loads. Moreover, heat from the heating medium heated by the heat pump is stored as stored energy in the storage section. Accordingly, even if the supply of electric power with the renewable energy is unstable, the unstableness can be buffered by storing heat from the heating medium heated by the heat pump as stored energy. In addition, the electrolytic reduction apparatus can give a reduced material from the electrolytic solution by heating the electrolytic solution with use of the stored energy as thermal energy and applying a voltage to the electrolytic solution with use of electric power energy generated by the heat engine with the stored energy. Here, the stored energy to be used for heating and voltage application for the electrolytic solution can be supplied more stably than the renewable energy itself to be supplied because the stored energy is stored in the storage section as energy given through the heat pump cycle. Accordingly, the temperature and applied voltage in the electrolytic reduction can be adjusted in a favorable manner, and the electrolytic reduction is allowed to efficiently progress. In addition, at least part of residual energy given by subtracting the energy to be used for heating the electrolytic solution from the stored energy can be used as requisite electric power for the electrolytic reduction. Furthermore, for reducing the emission of carbon dioxide through electrolytic reduction of an electrolytic solution to which carbon dioxide has been fed, not energy obtained through a process that inevitably involves discharging carbon dioxide but energy obtained through the heat pump cycle with the renewable energy is used as requisite thermal energy and electric power energy for the electrolytic reduction. This enables reduction in carbon dioxide emissions through minimizing the discharge of carbon dioxide.

For example, the controller may further perform management and operation for control parameters and states for at least any one of the heat pump, the storage section, the heat engine, and the electrolytic reduction apparatus.

For example, the present energy utilization system may include a reception section that receives a request from a consumer via a communication line.

Thus, the embodiments of the present disclosure have been described; however, it will be understood that various modifications in modes and details can be made without departing from the spirit and scope of the present disclosure that are described in Claims.

The invention claimed is:

1. An energy utilization system comprising:
a circulation circuit configured to circulate a heating medium; and
a heat pump,
the circulation circuit including
    a pump configured to receive the heating medium and output the heating medium,
    a heating section configured to heat the heating medium by using renewable energy or energy obtained from waste heat,
    an electrolytic reduction apparatus configured to heat an electrolytic solution with heat from the heating medium, and
    a thermal energy recovery section,
the heat pump being configured to be driven by using electric power generated with the renewable energy and to allow a first refrigerant to circulate therein,
the circulation circuit including a storage section configured to store heat from the heating medium as stored energy,
the heating section being configured to heat the heating medium with heat from the first refrigerant heated by the heat pump,
the thermal energy recovery section being a heat engine configured to generate electric power by using the stored energy, and
the electrolytic reduction apparatus being configured to apply a voltage to the electrolytic solution by using electric power generated by the heat engine.

2. The energy utilization system according to claim 1, wherein
the heating medium is water, and
the heating section is a boiler.

3. The energy utilization system according to claim 2, wherein
the thermal energy recovery section includes an expander, and
the electrolytic reduction apparatus is configured to apply a voltage to the electrolytic solution by using electric power generated by the expander.

4. The energy utilization system according to claim 1, wherein
the electrolytic reduction apparatus includes a reservoir section configured to reserve a heat storage medium that heats the electrolytic solution, and
the heat storage medium is heated through thermal contact with the heating medium flowing in the circulation circuit.

5. The energy utilization system according to claim 1, further comprising:
a carbon dioxide gas recovery section configured to
    allow carbon dioxide hydrate to grow by using cooling potential of the heating medium cooled by the heat pump and
    recover carbon dioxide as a gas by decomposing the carbon dioxide hydrate.

6. The energy utilization system according to claim 1, wherein
the heat pump includes a compressor and a first expander linked to the compressor via a driven shaft, and
rotation of the compressor is assisted with motive power recovered in the first expander.

7. The energy utilization system according to claim 1, wherein the electrolytic reduction apparatus includes at least one of a first electrolytic reduction apparatus configured to reduce the electrolytic solution by heating the electrolytic solution with use of the stored energy and applying a voltage to the electrolytic solution with use of electric power generated by the heat engine to give a carbon-containing material and a second electrolytic reduction apparatus configured to electrolyze water heated by using the stored energy.

8. The energy utilization system according to claim 1, wherein the first refrigerant in the heat pump is heated with the waste heat.

9. The energy utilization system according to claim 1, wherein the storage section includes a first storage section and a second storage section, and the first and second storage sections are configured such that the heating medium in the first storage section is heated by the heat pump and then sent to the second storage section.

10. The energy utilization system according to claim 1, further comprising:

a controller configured to control the heat pump, the storage section, the heat engine, and the electrolytic reduction apparatus, the controller being configured to control to allow the stored energy stored in the storage section and electric power generated by the heat engine to be used.

11. The energy utilization system according to claim 1, wherein the energy utilization system is configured to be used to supply, upon a request from a consumer, at least one of the stored energy stored in the storage section, electric power generated by the heat engine, and a material obtained by applying a voltage to the electrolytic solution in the electrolytic reduction apparatus.

12. A method for producing a carbon-containing material, the method comprising:

heating a heating medium circulating in a circulation circuit by using renewable energy or energy obtained from waste heat;

performing electrolytic reduction by heating an electrolytic solution with heat from the heating medium that has been heated;

storing heat from the heating medium as stored energy; and generating electric power through a heat engine cycle by using the stored energy, the heating medium being heated through a heat pump cycle with a first refrigerant circulating therein, the heat pump cycle being driven by using electric power generated with the renewable energy, and the electrolytic reduction being performed by heating the electrolytic solution with use of the stored energy and applying a voltage to the electrolytic solution with use of electric power generated through the heat engine cycle.

13. The method for producing a carbon-containing material according to claim 12, wherein the heating medium is water, and the water is heated in a boiler by using the renewable energy or energy obtained from the waste heat.

14. The method for producing a carbon-containing material according to claim 13, further comprising:

recovering thermal energy of the heating medium and generating electric power with an expander; and applying a voltage to the electrolytic solution by using electric power generated with the expander.

15. The method for producing a carbon-containing material according to claim 12, wherein a heat storage medium reserved in a reservoir section is heated with heat from the heating medium that has been heated, and the electrolytic solution is heated with heat from the heat storage medium that has been heated.

16. The method for producing a carbon-containing material according to claim 12, further comprising:

electrolyzing water heated by using the stored energy.

17. The method for producing a carbon-containing material according to claim 12, further comprising:

heating a refrigerant in the heat pump cycle with the waste heat.

18. The method for producing a carbon-containing material according to claim 12, wherein the heating medium is one or more selected from the group consisting of:

a mixed fluid containing sand or rock together with air; and a molten salt.

19. The method for producing a carbon-containing material according to claim 12, wherein the heating medium is one or more selected from the group consisting of:

a mixed fluid containing sand or rock together with air;

water;

a thermal oil;

an ionic liquid; and a molten salt.

* * * * *